United States Patent [19]

Gellert

[11] 4,125,352

[45] Nov. 14, 1978

[54] THERMAL VALVE PIN

[76] Inventor: Jobst U. Gellert, 11 Newton Rd., Brampton, Ontario, Canada

[21] Appl. No.: 793,499

[22] Filed: May 4, 1977

[30] Foreign Application Priority Data

Apr. 29, 1977 [CA] Canada .................................. 277440

[51] Int. Cl.² ............................................. B29F 1/03
[52] U.S. Cl. .................................... 425/566; 425/549
[58] Field of Search ..................... 123/41.16; 137/341; 165/105; 251/319; 425/549, 564, 566, 567

[56] References Cited

U.S. PATENT DOCUMENTS

| | | | |
|---|---|---|---|
| 2,395,942 | 3/1946 | Saffady | 123/41.16 |
| 2,410,190 | 10/1946 | Townhill | 123/41.16 X |
| 2,611,348 | 9/1952 | Lindsay | 123/41.16 |
| 3,233,599 | 2/1966 | Schober | 123/41.16 |
| 3,488,810 | 1/1970 | Gellert | 425/567 X |
| 3,701,342 | 10/1972 | Owsley et al. | 165/105 UX |

Primary Examiner—Gerald A. Michalsky
Attorney, Agent, or Firm—Murray & Whisenhunt

[57] ABSTRACT

This invention relates to an improved valve pin for a valve gating injection molding system. Heat transfer to the gate area is extremely critical in valve gating systems and this is even more so when new high density glass filled materials are being molded. Thus it is necessary to provide substantially increased and more uniform heat transfer to the gate area. Accordingly, the invention provides an improved valve pin having at least a portion of the valve pin adjacent the tip end being formed of an elongated hollow sealed tube which contains a vaporizable fluid under a partial vacuum. The back end of the tube receives heat from the surrounding heater cast to vaporize the fluid in the area. The vapor pressure establishes circulation of the vapor towards the cooler tip end of the tube. The energy required to evaporate a liquid is the latent heat of vaporization and this energy is released by the vapor when it condenses upon encountering a cooler portion of the tube as it moves towards the tip end. The condensed liquid then returns to the back end of the tube where it is again evaporated. Circulation may be very rapid to provide a very greatly increased rate of heat transfer along the tube and the temperature drop along the length of the tube is reduced to a minimum. This allows minimum injection pressures and valve pin forces to be used with consequent decreases in manufacturing and operating problems and expense.

8 Claims, 4 Drawing Figures

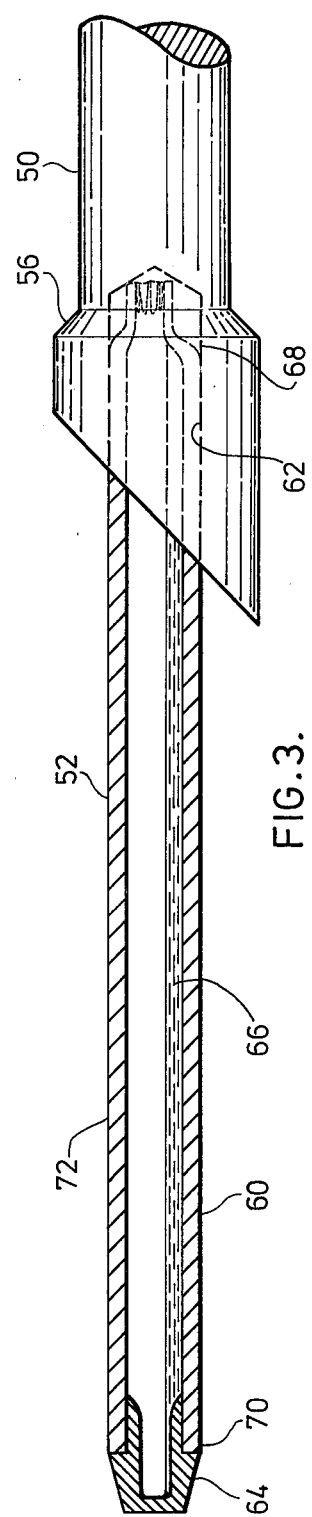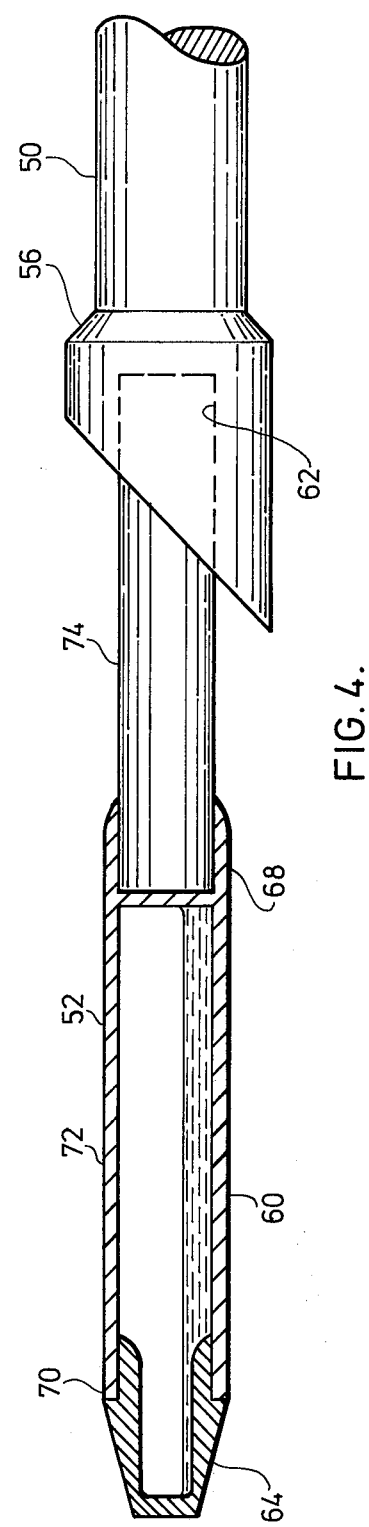

THERMAL VALVE PIN

BACKGROUND OF THE INVENTION

This invention relates to an improved valve pin for a valve gating injection molding system.

In the past, a wide variety of valve gating systems have been used with varying success for injection molding different materials in different applications. However, while having a variety of different arrangements for providing heat in the gate area, these previous systems have primarily emphasized the valving system and failed to appreciate the degree to which heat transfer to the gate area is critical to the operation of the whole system. While these previous systems do operate for some materials under favourable conditions, their performance is not optimum and their performance is particularly unsatisfactory for more difficult materials under difficult conditions. Without sufficient heat transfer to the gate area, increased injection pressures are required as well as increased force on the valve pin which both in turn lead to subsequent operating difficulties and increased cost. In addition, the heaters in many of these previous systems are subject to the problems of burn out and overheating.

More recently, it has become highly desirable to mold new high density materials such as up to 60% glass-filled nylon to replace aluminum molded products. Conventional valve gating systems which do not provide sufficient uniform heat to the gate area have been unable to mold these types of materials. With conventional thermoplastic materials which gradually soften with increased temperatures, closing problems have been overcome by increasing the valve pin force to the area of 400 to 800 pounds. With crystalline materials even this short sighted solution is not available because the melt solidifies very sharply with reduced temperatures. By providing sufficient heat to the gate area the present invention will enable most applications to be run with reduced valve pin forces in the area of from 150 to 300 pounds.

Furthermore, in some molding applications it is desirable to form a hole in the molded product to coincide with the gate opening. This may be done by providing for the valve pin to penetrate through the plastic part and seat against the core of the mold as well as in the gate itself. This requires an even transfer of sufficient heat from the upper portion of the heater cast and the melt to the tip of the valve pin where in the past it has been very difficult to maintain and particularly to control temperatures at the necessary level.

SUMMARY OF THE INVENTION

Accordingly, it is an object of the present invention to at least partially overcome these disadvantages by providing a valve gating system with an improved valve pin whereby heat may be transferred to the gate area through the valve pin at an increased rate to maintain a more uniform temperature.

To this end, the invention provides an elongated injection molding valve pin having a driven end and a tip end, at least a portion of the valve pin adjacent the tip end being formed of an elongated hollow sealed tube, the hollow tube containing a vaporizable liquid under a partial vacuum whereby heat transfer is provided towards the tip end of the valve pin.

Further objects and advantages of the invention will appear from the following description taken together with the accompanying drawings.

BRIEF DESCRIPTION OF THE DRAWINGS

FIG. 3 is a partial longitudinal sectional view of the valve pin seen in FIG. 2; and FIG. 4 is a partial longitudinal sectional view of a valve pin according to a second embodiment of the invention.

DETAILED DESCRIPTION OF THE DRAWINGS

Figure 1:
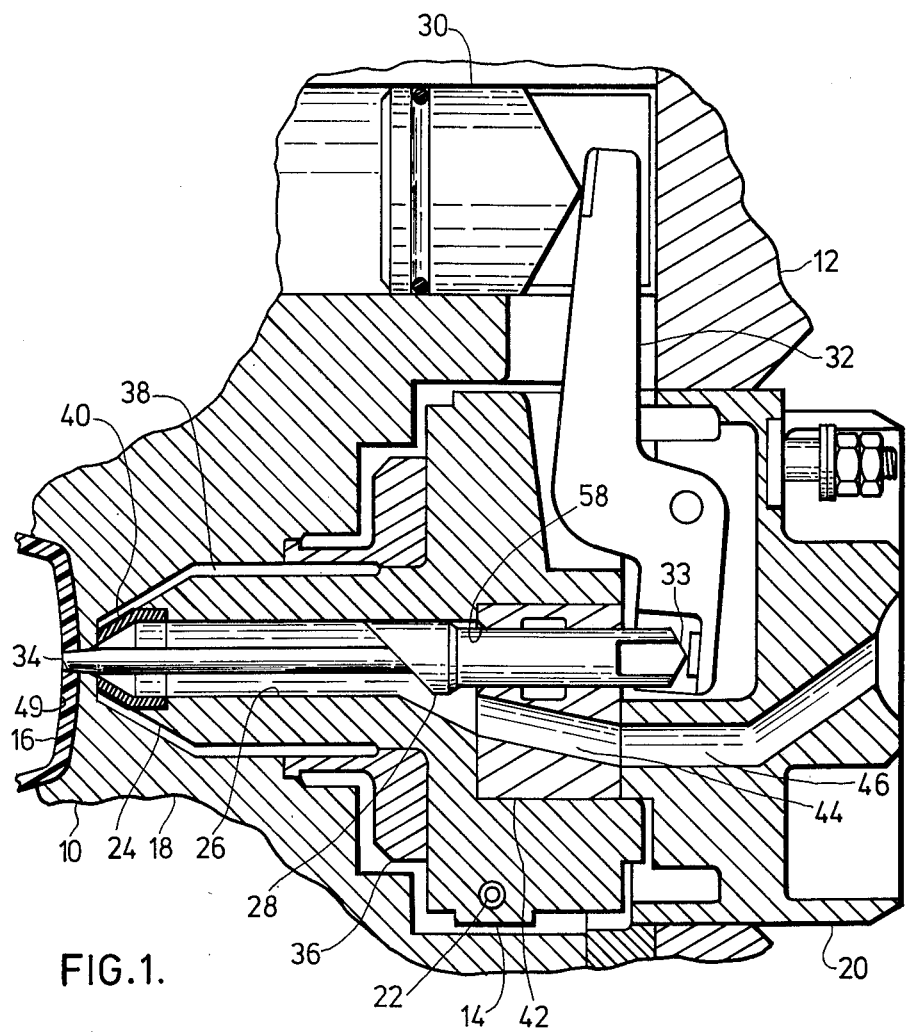
FIG. 1 is a partial section view of a valve gating injection molding system utilizing a valve pin according to a first embodiment of the invention.

Reference is first made to FIG. 1 which shows a valve gating injection mold system having a single cavity mold 10 positioned adjacent a molding machine 12 with a beryllium-copper heater cast 14 enclosed in the mold above a cavity 16. The mold 10 has a cavity plate 18 and a back plate 20. The heater cast 14 is heated by an electrical element 22 and has a lower nozzle portion 24 and a central cylindrical bore 26 in which the valve pin 28 is located. An air operated piston 30 pivots rocker arm 32 which contacts the valve pin 28 at its driven end 33 to move it into the gate 34 to close the valve. As may be seen, the heater cast 14 is located in the cavity plate 18 by bushing 36. An air space 38 reduces heat loss from the heater cast 14 to the cooled cavity plate 18. A titanium seal 40 prevents flow of the molten plastic material or melt into the air space 38 and assists in transferring heat to the gate area. The bore 26 extends through bushing seal 42 which also has a portion 44 of the hot runner passage 46 extending from the molding machine 12.

In use, molten plastic material from the molding machine 12 is forced under pressure through the hot runner passage 46 which extends through the back plate 20 and the bushing seal 42 into the heater cast 14 where it joins the bore 26. The melt flows on through the bore 26 around the valve pin 28 where it passes through gate 34 into cavity 16. The valve is provided by the frusto-conical tip end 48 of the valve pin 28 seating in the gate 34. As may be seen, in this application the end of the valve pin 28 seats against the core 49 of the mold which forms a hole in the molded product at this location.

Figure 2:
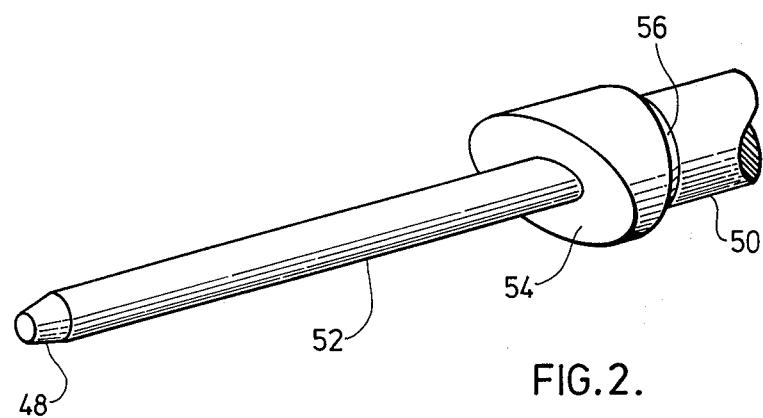
FIG. 2 is a partial perspective view of the valve pin seen in FIG. 1.

Referring to FIGS. 2 and 3, the valve pin 28 has an enlarged driven end portion 50 and a smaller diameter tip end portion 52. The two meet at inclined face 54 and the enlarged driven end portion 50 has a circumferential inclined shoulder 56 which is received in circular seat 58 in the bushing seal 42. In this embodiment, the tip end portion 52 of the valve pin 28 is formed of a hollow titanium tube 60 which is secured in alignment with the driven end portion 50 by having its crimped end received and brazed in well seat 62 in the driven end portion 50. An end sealing cap 64 is brazed into the other end to form frusto-conical tip end 48. The driven end portion 50 of the valve pin 28 is formed of steel having a suitable wear resistance and strength ratio while the tube 60 is formed of titanium and the sealing cap 64 is formed of steel.

In this embodiment, approximately 32 percent (at 30° C.) of the volume of the tube is filled with deionized, degassed, distilled water after the tube is degassed under a vacuum. The ends of the tube are sealed as described above and it is apparent that the seal must be air-tight. While the amount of water in this embodiment is 32%, this may range for different applications from approximately 10% to approximately 50%. Similarly, other suitable materials such as zircaloy 2 and zircaloy 4 may be used to form the tube 60.

In use, the electric heater element 22 heats the heater cast 14 to a predetermined temperature. This heat is conducted to the driven end portion 50 of the valve pin 28 which encloses the back end 68 of the tube 60. According to known heat pipe or thermal pin principles, this heat will vapourize the water in that area and the vapour pressure will cause it to circulate towards the front or tip end 70 of the tube 60. When a cooler portion of the wall 72 of the tube 60 is encountered by the vapour, it will condense and flow back towards the back end 68. Circulation is very rapid and when the water is evaporated it absorbs the latent heat of vapourization and the energy is released by the vapour when it condenses upon encountering a cooler portion of the tube as it moves towards the tip end. Accordingly, heat is transferred to the tip end 70 with a minimum temperature of drop along the length of the tube 60. The incoming melt is a particularly important source of heat to the valve pin because it comes in at an accurately controlled temperature and the rapid transfer of this heat along the tube 60 serves to maintain the melt in the front portion of the bore and the gate area at a nearly uniform temperature. Thus heat is taken from the two different sources and transferred to the immediate gate area and this greatly increased heat transfer and particularly the accurate temperature control permits the molding of difficult to handle engineering material and materials with added flame retardant agents such as glass reinforced nylon. Furthermore, it provides sufficient heat to the tip end of the valve pin to enable it to be seated in the position shown in FIG. 1 against the core of the mold to provide a suitable hole in the molded product. It is desirable that the outside diameter of the tip end portion 52 of the valve pin 28 be as small as possible to provide for adequate flow of the melt, yet it is necessary that it be of sufficient strength to repeatedly withstand the valve pin operating force required to close the valve. Therefore it is desirable that the internal diameter be as small as possible while providing satisfactory heat transfer characteristics. In most applications the valve pin may be horizontally aligned which reduces the space requirement by avoiding the need for a wick inside the tube 60 to return the condensed liquid to the back end 68 of the tube. In the case of the new high percentage glass-filled materials, operating temperatures will normally be in the range of 450° to 500° F., although provision should be made for temperatures up to approximately 650° F.

FIG. 4 illustrates a second embodiment of the invention and as many of the features are identical to those of the first embodiment, features common to both embodiments are described and illustrated using the same reference numerals. In the second embodiment, the tip end portion 52 of the valve pin 28 is formed of a solid portion 74 secured between the driven end portion 50 and the hollow tube 60. The solid portion 74 is normally formed of steel and this embodiment is used in applications where the rate of heat transfer to the gate area need not be as great. Otherwise, the structure and operation of this second embodiment is the same as that of the first embodiment and need not be described further.

Although the disclosure describes and illustrates two preferred embodiments of the invention, it is to be understood that the invention is not restricted to these embodiments. In particular, it will be apparent that different suitable materials and dimensions may be used depending upon the heat transfer and strength characteristics required for the particular application.

What I claim is:

1. In a plastics molding system comprising a mold, a molding machine, a hot runner passage for containing a plastic melt and extending from the molding machine to the mold, a gate for the mold and a valve pin for said gate, wherein the valve pin has a driven end and a tip end and at least the portion of the valve pin having the tip end is disposed in the hot runner passage, the improvement wherein at least the portion of the valve pin near the tip end is formed of a hollow sealed tube containing a vaporizable liquid under partial vacuum, whereby heat from the plastics melt in the hot runner passage vaporizes the liquid in the hotter portion of the sealed tube nearest the driven end of the valve pin and the resulting vapor circulates toward the cooler portion of the sealed tube nearest the tip end and condenses, so that heat is transferred to the tip end of the sealed tube.

2. The system as claimed in claim 1 wherein the tip end of the pin is securely fixed to the driven end, the tip end being smaller in diameter than the driven end and the tip end being formed at least in part by the hollow tube.

3. The system as claimed in claim 2 wherein the tip end portion includes a solid portion securely fixed between the driven end portion and the hollow tube.

4. The system as claimed in claim 2 wherein the tip end is fixed to the driven end by being partially received in a well seat in the driven end.

5. The system as claimed in claim 1 wherein the tip end of the valve pin has a frusto-conical shape formed by an end sealing cap fixed to the tube.

6. The system as claimed in claim 1 wherein the tube is formed of a titanium alloy.

7. The system as claimed in claim 1 wherein the hollow tube is approximately 1/4 filled with the vapourizable liquid.

8. The system as claimed in claim 1 wherein the vapourizable liquid is distilled water.

* * * * *